(12) United States Patent
Chen

(10) Patent No.: US 7,420,021 B2
(45) Date of Patent: Sep. 2, 2008

(54) SELF-EXTINGUISHING CATALYST COMPOSITION WITH MONOCARBOXYLIC ACID ESTER INTERNAL DOOR AND PROPYLENE POLYMERIZATION PROCESS

(75) Inventor: Linfeng Chen, Sugar Land, TX (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 19 days.

(21) Appl. No.: 10/568,981

(22) PCT Filed: Aug. 18, 2004

(86) PCT No.: PCT/US2004/026640

§ 371 (c)(1),
(2), (4) Date: Feb. 21, 2006

(87) PCT Pub. No.: WO2005/035594

PCT Pub. Date: Apr. 21, 2005

(65) Prior Publication Data

US 2007/0032376 A1  Feb. 8, 2007

Related U.S. Application Data

(60) Provisional application No. 60/505,313, filed on Sep. 23, 2003.

(51) Int. Cl.
C08F 4/42 (2006.01)
(52) U.S. Cl. .............. 526/128; 526/351; 526/124.2; 526/124.3; 502/103; 502/116; 502/127
(58) Field of Classification Search .......... 526/351, 526/128, 124.2, 124.3; 502/103, 116, 127
See application file for complete search history.

(56) References Cited

U.S. PATENT DOCUMENTS

| | | |
|---|---|---|
| 4,107,413 A | 8/1978 | Giannini et al. |
| 4,115,319 A | 9/1978 | Scata et al. |
| 4,220,554 A | 9/1980 | Scata et al. |
| 4,294,721 A | 10/1981 | Cecchin et al. |
| 4,330,649 A | 5/1982 | Kioka et al. |
| 4,439,540 A | 3/1984 | Cecchin et al. |
| 4,442,276 A | 4/1984 | Kashiwa et al. |
| 4,460,701 A | 7/1984 | Terano et al. |
| 4,472,521 A | 9/1984 | Band |
| 4,540,679 A | 9/1985 | Arzoumanidis et al. |
| 4,547,476 A | 10/1985 | Terano et al. |
| 4,548,915 A | 10/1985 | Goodall et al. |
| 4,562,173 A | 12/1985 | Terano et al. |
| 4,728,705 A | 3/1988 | Nestlerode et al. |
| 4,816,433 A | 3/1989 | Terano et al. |
| 4,829,037 A | 5/1989 | Terano et al. |
| 4,927,797 A | 5/1990 | Ewen |
| 4,990,479 A | 2/1991 | Ishimaru et al. |
| 5,028,671 A | 7/1991 | Kioka et al. |
| 5,034,361 A | 7/1991 | Job et al. |
| 5,066,737 A | 11/1991 | Job |
| 5,066,738 A | 11/1991 | Ewen |
| 5,077,357 A | 12/1991 | Job |
| 5,082,907 A | 1/1992 | Job |
| 5,100,981 A | 3/1992 | Schreck et al. |
| 5,106,806 A | 4/1992 | Job |
| 5,146,028 A | 9/1992 | Job |
| 5,151,399 A | 9/1992 | Job |
| 5,153,158 A | 10/1992 | Kioka et al. |
| 5,192,732 A | 3/1993 | Duranel et al. |
| 5,229,342 A | 7/1993 | Job |
| 5,247,031 A | 9/1993 | Kioka et al. |
| 5,247,032 A | 9/1993 | Kioka et al. |
| 5,414,063 A | 5/1995 | Seeger et al. |
| 5,432,244 A * | 7/1995 | Rebhan ............... 526/124.8 |
| 5,652,303 A | 7/1997 | Ishimaru et al. |
| 5,844,046 A | 12/1998 | Ohgizawa et al. |
| 5,849,654 A | 12/1998 | Fushimi et al. |
| 5,869,418 A | 2/1999 | Iiskola et al. |
| 6,066,702 A | 5/2000 | Ro et al. |
| 6,087,459 A | 7/2000 | Miro et al. |
| 6,096,844 A | 8/2000 | Fushimi et al. |
| 6,111,039 A | 8/2000 | Miro et al. |
| 6,127,303 A | 10/2000 | Ebara et al. |
| 6,133,385 A | 10/2000 | Shamshoum et al. |
| 6,147,024 A | 11/2000 | Shamshoum et al. |
| 6,184,328 B1 | 2/2001 | Yanagihara et al. |
| 6,303,698 B1 | 10/2001 | Ushioda et al. |
| 6,337,377 B1 | 1/2002 | Ebara et al. |

FOREIGN PATENT DOCUMENTS

| | | |
|---|---|---|
| EP | 0 490 451 A2 * | 6/1992 |
| EP | 490451 | 6/1992 |
| JP | 61/203105 | 9/1986 |
| JP | 61-203105 * | 9/1986 |
| WO | WO 95/21203 | 8/1995 |
| WO | WO 99/20663 | 4/1999 |
| WO | WO 99/58585 | 11/1999 |

* cited by examiner

Primary Examiner—Ling-Sui Choi
(74) Attorney, Agent, or Firm—Whyte Hirschboeck Dudek SC

(57) ABSTRACT

A catalyst composition for the polymerization of propylene comprising one or more Ziegler-Natta procatalyst compositions comprising one or more transition metal compounds and one or more monoesters of aromatic carboxylic acid internal electron donors; one or more aluminum containing cocatalysts; and a mixture of two or more different selectivity control agents, said SCA mixture comprising from 98.0 to 99.9 mol percent of one or more esters of one or more aromatic monocarboxylic acids or substituted derivatives thereof, and from 2.0 to 0.1 mol percent of one or more alkoxysilane compounds.

17 Claims, No Drawings

US 7,420,021 B2

SELF-EXTINGUISHING CATALYST COMPOSITION WITH MONOCARBOXYLIC ACID ESTER INTERNAL DOOR AND PROPYLENE POLYMERIZATION PROCESS

CROSS REFERENCE STATEMENT

This application claims the benefit of U.S. Provisional Application No. 60/505,313, filed Sep. 23, 2003.

BACKGROUND OF THE INVENTION

The present invention relates to stereoselective Ziegler-Natta catalyst compositions for use in the polymerization of propylene having improved control over polymerization activity and reactor process continuity through the use of carefully chosen mixtures of selectivity control agents. Ziegler-Natta propylene polymerization catalyst compositions are well known in the art. Typically, these compositions include a transition metal compound, especially a mixed titanium, magnesium and halide containing compound in combination with an internal electron donor (referred to as a procatalyst); a co-catalyst, usually an organoaluminum compound; and a selectivity control agent (SCA). Examples of such Ziegler-Natta catalyst compositions are shown in: U.S. Pat. No. 4,107,413; U.S. Pat. No. 4,115,319; U.S. Pat. No. 4,220,554; U.S. Pat. No. 4,294,721; U.S. Pat. No. 4,330,649; U.S. Pat. No. 4,439,540; U.S. Pat. No. 4,442,276; U.S. Pat. No. 4,460,701; U.S. Pat. No. 4,472,521; U.S. Pat. No. 4,540,679; U.S. Pat. No. 4,547,476; U.S. Pat. No. 4,548,915; U.S. Pat. No. 4,562,173; U.S. Pat. No. 4,728,705; U.S. Pat. No. 4,816,433; U.S. Pat. No. 4,829,037; U.S. Pat. No. 4,927,797; U.S. Pat. No. 4,990,479; U.S. Pat. No. 5,028,671; U.S. Pat. No. 5,034,361; U.S. Pat. No. 5,066,737; U.S. Pat. No. 5,066,738; U.S. Pat. No. 5,077,357; U.S. Pat. No. 5,082,907; U.S. Pat. No. 5,106,806; U.S. Pat. No. 5,146,028; U.S. Pat. No. 5,151,399; U.S. Pat. No. 5,153,158; U.S. Pat. No. 5,229,342; U.S. Pat. No. 5,247,031; U.S. Pat. No. 5,247,032 and U.S. Pat. No. 5,432,244.

Catalyst compositions designed primarly for the polymerization of propylene or mixtures of propylene and ethylene generally include a selectivity control agent in order to affect polymer properties, especially tacticity or stereoregularity of the polymer backbone. As one indication of the level of tacticity, especially the isotacticity of polypropylene, the quantity of such polymer that is soluble in xylene or similar liquid that is a non-solvent for the tactic polymer is often used. The quantity of polymer that is soluble in xylene is referred to as xylene solubles content or XS. In addition to tacticity control, molecular weight distribution (MWD), melt flow (MY), and other properties of the resulting polymer are affected by use of a SCA as well. It has also been observed that the activity of the catalyst composition as a function of temperature may be affected by the choice of SCA. Often however, a SCA which gives desirable control over one polymer property, is ineffective or detrimental with respect to additional properties or features. Conversely, an SCA that is effective in combination with one procatalyst may not be effective when used in combination with a different procatalyst.

It is known that the use of certain alkoxy derivatives of aromatic carboxylic acid esters, especially ethyl p-ethoxybenzoate (PEEB), in combination with a Ziegler-Natta procatalyst composition containing a monoester of an aromatic monocarboxylic acid, exemplified by ethyl benzoate, results in an inferior catalyst composition possessing lower overall polymerization activity and polymers having relatively low isotacticities and increased oligomer contents, all of which are generally undesired results.

Disadvantageously however, alkoxysilane SCA's, exemplified by dicyclopentyldimethoxy-silane (DCPDMS), methylcyclohexyldimethoxysilane (MChDMS) and n-propyltrimethoxysilane (NPTMS) when used in combination with ethylbenzoate internal electron donor results in catalyst compositions that are not generally self-extinguishing. That is, these compositions can give polymerization process control problems, especially sheeting and formation of large polymer chunks due to hard to control temperature excursions allowing polymer particles to form agglomerates. Such catalyst compositions are not "self-extinguishing". Rather, at moderately higher reaction temperatures, they tend to be more active, resulting in difficult to control processes. At temperature close to the softening or melting point of the polymer being produced, they still possess considerable activity so that the heat generated from the exothermic polymerization reaction can significantly contribute to the formation of agglomerates. In addition, under conditions of a reactor upset or a power outage, the normally fluidized reaction bed of a gas phase polymerization reactor may settle to the diffuser plate of the reactor. In that state, continued polymerization may generate excessive temperatures, resulting in fusion of the entire reactor contents into a solid mass which requires opening of the reactor and laborious effort to remove the polymer mass.

Use of mixtures of SCA's in order to adjust polymer properties is known. Examples of prior art disclosures of catalyst compositions making use of mixed SCA's, especially mixtures of silane or alkoxysilane SCA's include: U.S. Pat. No. 5,100,981, U.S. Pat. No. 5,192,732, U.S. Pat. No. 5,414,063, U.S. Pat. No. 5,432,244, U.S. Pat. No. 5,652,303, U.S. Pat. No. 5,844,046, U.S. Pat. No. 5,849,654, U.S. Pat. No. 5,869,418, U.S. Pat. No. 6,066,702, U.S. Pat. No. 6,087,459, U.S. Pat. No. 6,096,844, U.S. Pat. No. 6,111,039, U.S. Pat. No. 6,127,303, U.S. Pat. No. 6,133,385, U.S. Pat. No. 6,147,024, U.S. Pat. No. 6,184,328, U.S. Pat. No. 6,303,698, U.S. Pat. No. 6,337,377, WO 95/21203, WO 99/20663, and WO 99/58585. References generally showing mixtures of silanes with monocarboxylic acid ester internal electron donors or other SCA's include: U.S. Pat. No. 5,432,244, U.S. Pat. No. 5,414,063, JP61/203,105, and EP-A-490,45 1.

Despite the advances occasioned by the foregoing disclosures, there remains a need in the art to provide an aromatic monocarboxylic acid ester internal electron donor containing Ziegler-Natta catalyst composition for the polymerization of olefins, especially propylene and propylene containing mixtures, wherein the catalyst composition retains the advantages of alkoxysilane SCA containing catalyst compositions with regard to polymer properties, but additionally possesses improved temperature/activity properties. Especially desired are such compositions that are inherently self-extinguishing with regard to catalyst activity as a function of temperature, thereby leading to reduced polymer agglomerate formation, improved polymerization process control, and increased immunity to reactor upset or power outages.

SUMMARY OF THE INVENTION

The present invention provides a catalyst composition for the polymerization of propylene or mixtures of propylene and one or more copolymerizable comonomers, said catalyst composition comprising one or more Ziegler-Natta procatalyst compositions comprising one or more transition metal compounds and one or more monoesters of aromatic carboxylic acid internal electron donors; one or more aluminum containing cocatalysts; and a mixture of two or more different selectivity control agents, said SCA mixture comprising from 98.0 to 99.9 mol percent of one or more esters of one or more aromatic monocarboxylic acids or substituted derivatives thereof, and from 2.0 to 0.1 mol percent of one or more alkoxysilane compounds.

The present invention also provides a method of polymerizing propylene or mixtures of propylene and one or more copolymerizable comonomers under polymerization conditions using the previously described Ziegler-Natta catalyst composition comprising said mixture of SCA's. More particularly, the process comprises contacting propylene or a mixture of propylene and one or more copolymerizable comonomers under polymerization conditions at a temperature from 45 to 100° C., preferably from 55 to 90° C., more preferably 60 to 85° C., with a catalyst composition comprising one or more Ziegler-Natta procatalyst compositions comprising one or more transition metal compounds and one or more internal electron donors selected from the group consisting of esters of aromatic monocarboxylic acids; one or more aluminum containing cocatalysts; and a mixture of two or more different selectivity control agents, said SCA mixture comprising from 98.0 to 99.9 mol percent of one or more esters of one or more aromatic monocarboxylic acids or substituted derivatives thereof, and from 2.0 to 0.1 mol percent of one or more alkoxysilane compounds.

Highly desirably, the polymerization is conducted under conditions of temperature and SCA content such that no substantial polymer agglomerates are formed in the polymer product and sheeting or fouling of the reactor surfaces is reduced, and preferably, eliminated. Moreover, the present catalyst composition is substantially inherently self-extinguishing.

Although a broad range of compounds are known generally as selectivity control agents, a particular catalyst composition may have a specific compound or group of compounds with which it is especially compatible. The present invention provides a catalyst composition for the polymerization of propylene or mixtures of propylene and one or more copolymerizable comonomers which is especially useful with Ziegler-Natta procatalyst compositions formed by halogenation of mixed alkoxide metal compounds. As a result of the present inventors discovery, it has been unexpectedly discovered that in the foregoing operating range of mixed SCA's the advantages of using an alkoxysilane in combination with an aromatic monocarboxylic acid ester internal electron donor can be largely retained while simultaneously improving the self-extinguishing properties of the polymerization catalyst. Additional benefits of the invention include preparation of polymers having narrowed molecular weight distribution. The invention is particularly suited for use in the preparation of elastomeric ethylene/propylene (EP) and ethylene/propylene/diene (EPDM) copolymers where elevated reactor temperatures can easily lead to sticking and agglomeration of the polymer particles.

DETAILED DESCRIPTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication referenced herein are hereby incorporated by reference in their entirety herein, especially with respect to the disclosure of structures, synthetic techniques and general knowledge in the art. The term "aromatic" or "aryl" refers to a polyatomic, cyclic, ring system containing $(4\delta+2)$ $\pi$-electrons, wherein $\delta$ is an integer greater than or equal to 1.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

Unless stated to the contrary or conventional in the art, all parts and percents used herein are based on weight. The term "(poly)alkyl-substituted" means optionally more than one alkyl substituent. The term "mixture" when used with respect to SCA's, means the use of two or more SCA components, simultaneously during at least a portion of a polymerization. The individual SCA's may be added separately to a reactor or premixed and added to the reactor in the form of the desired mixture. In addition, other components of the polymerization mixture, including the procatalyst, may be combined with one or more of the SCA's of the mixture, and/or the procatalyst, cocatalyst and a portion of the monomer optionally prepolymerized, prior to addition to the reactor.

The benefits of the invention are obtained by operation in a range of limited availability of alkoxysilane compound, such that desirable polymer properties exemplified by melt flow, molecular weight distribution, and/or xylene solubles content, especially MF, are largely retained while substantially reducing the polymerization activity of the catalyst composition at elevated reactor temperatures, especially reactor temperatures from 85 to 130° C., preferably from 100 to 120° C.

Catalyst compositions demonstrating substantially decreased activity at elevated temperatures, especially at temperatures greater than 100° C., more preferably greater than 80° C. compared to a standard temperature such as 67° C., are said to be self-extinguishing. In addition, as a practical standard, if a polymerization process, especially a fluidized bed, gas-phase polymerization, running at normal processing conditions is capable of interruption and resulting collapse of the bed without adverse consequences with respect to agglomeration of polymer particles, the catalyst composition is said to be self-extinguishing.

A complex calculation may be used to compare catalyst activities when polymers having different tacticities (measured as xylene solubles or XS) are prepared. The empirically derived equation used to convert catalyst activity to that of a standard polymer containing 4 percent XS is:

$$Y_4 = Y + 31.52 - 10.31X + 0.61X^2, \text{ wherein}$$

$Y_4$ is normalized activity (kg/g procatalyst) at 4.0 percent XS,

Y is the measured catalyst activity (kg/g procatalyst), and

X is the XS content of the polymer in percent measured by the $^1$H NMR technique of U.S. Pat. No. 5,539,309.

It is to be understood that the present invention is not limited to the use of any particular polymerization conditions in practice. In fact, the invention is particularly beneficial when employed under gas phase polymerization conditions, in as much as control of reaction temperature and prevention of polymer agglomeration is especially critical in a gas phase polymerization, particular under conditions of a reactor upset or power outage.

Suitable alkoxysilanes for use in the mixture of SCA's herein are compounds having the general formula: $SiR_m(OR')_{4-m}(I)$ where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-20}$ alkyl group; and m is 0, 1, 2 or 3. Preferably, R is $C_{6-12}$ aryl, alkaryl or aralkyl, $C_{3-12}$ cycloalkyl, $C_{3-12}$ branched alkyl, or $C_{3-12}$ cyclic amino group, R' is $C_{1-4}$ alkyl, and m is 1 or 2. Examples of alkoxysilane selectivity control agents for use herein include: dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, isobutylisopropyldimethoxysilane, di-n-butyldimethoxysilane, cyclopentyltrimethoxysilane, isopropyltrimethoxysilane, n-propyltrimethoxysilane, n-propytriethoxysilane, ethyltriethoxysilane, tetramethoxysilane, tetraethoxysilane, cyclopentylpyrrolidinodimethoxysilane, bis(pyrrolidino)dimethoxysilane, and bis(perhydroisoquinolino)dimethoxysilane. Preferred alkoxysilanes are those containing two methoxy groups. More preferably, the alkoxysilanes contain at least one isopropyl, isobutyl, or $C_{5-6}$ cycloalkyl group, especially diisopropylclimethoxysilane, diisobutyldimethoxysilane, isobutylisopropyldimethoxysilane, dicyclopentyldimethoxysilane and methylcyclohexyldimethoxysilane. The latter two silanes are particularly preferred alkoxysilanes for use in the present invention.

Suitable esters of aromatic monocarboxylic acids for use in combination with the foregoing alkoxysilane compounds in the SCA mixture include $C_{1-20}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 16, or 17 heteroatoms. Examples of such substituents include (poly)alkylether, cycloalkylether, arylether, aralkylether, alkylthioether, arylthioether, dialkylamine, diarylamine, diaralkylamine, and trialkylsilane groups. Preferred are $C_{1-20}$ hydrocarbyl esters of benzoic acid wherein the hydrocarbyl group is unsubstituted or substituted with one or more Group 14, 15, 16, or 17 heteroatom containing substituents and $C_{1-20}$(poly) hydrocarbyl ether derivatives thereof, more preferred are $C_{1-4}$ alkyl benzoates and $C_{1-4}$ ring alkylated derivatives thereof, especially, methyl benzoate, ethyl benzoate, propyl benzoate, methyl p-methoxybenzoate, methyl p-ethoxybenzoate, ethyl p-methoxybenzoate, and ethyl p-ethoxybenzoate, and most especially, ethyl benzoate or ethyl p-ethoxybenzoate.

An especially preferred combination of SCA components is a mixture of ethyl p-ethoxy-benzoate and dicyclopentyldimethoxysilane or methylcyclohexyldimethoxysilane.

Preferred SCA mixtures according to the invention are those comprising from 98.5 to 99.5 mol percent, more preferably from 98.6 to 99.0 mol percent of one or more esters of one or more aromatic monocarboxylic acids or substituted derivatives thereof, and from 1.5 to 0.5 mol percent, more preferably from 1.4 to 1.0 mol percent of one or more of the specified alkoxysilane compounds.

If larger quantities of monoester are employed in the SCA mixture, the polymerization activity and selectivity of the reaction are adversely affected. If larger quantities of alkoxysilane are employed, the self-extinguishing properties of the invention are not obtained and increased reaction temperatures, especially temperatures from 65 to 120° C., preferably 80 to 100° C. cannot be employed without possibly encountering operational difficulties such as agglomerate formation and loss of self-extinguishing properties.

The total molar quantity of the SCA mixture employed in the present invention based on moles of transition metal is desirably from 0.1 to 1000, more desirably from 0.5 to 500 and most preferably from 1 to 100. The total molar quantity of cocatalyst employed in the present invention based on total moles of SCA mixture is desirably from 0.1 to 1000, more desirably from 1 to 50 and most preferably from 2 to 30.

One measure of self-extinguishing properties for a catalyst composition is that the normalized polymerization activity at an elevated temperature of the composition should be less than that obtainable at a reduced temperature such as 65° C. In addition, the normalized polymerization activity of the composition should also be less than that of a comparable catalyst composition wherein the alkoxysilane alone is employed in the same total SCA molar amount at the temperature of interest.

Ziegler-Natta procatalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, especially a magnesium halide.

Any of the conventional Ziegler-Natta, transition metal compound containing procatalysts can be used in the present invention. The procatalyst component of a conventional Ziegler-Natta catalyst preferably contains a transition metal compound of the general formula $TrX_x$ where Tr is the transition metal, X is a halogen or a $C_{1-10}$ hydrocarboxyl or hydrocarbyl group, and x is the number of such X groups in the compound in combination with the foregoing Group 2 metal compound. Preferably, Tr is a Group 4, 5 or 6 metal, more preferably a Group 4 metal, and most preferably titanium. Preferably, X is chloride, bromide, $C_{1-4}$ alkoxide or phenoxide, or a mixture thereof, more preferably chloride.

Illustrative examples of suitable transition metal compounds that may be used to form a Ziegler-Natta procatalyst are $TiCl_4$, $TiCl_3$, $ZrCl_4$, $TiBr_4$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. A preferred transition metal compound is a titanium compound.

Examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. A most preferred Group 2 metal compound is magnesium dichloride.

Highly desirably, the procatalysts employed in the invention are derived from magnesium compounds. Examples include anhydrous magnesium chloride, magnesium chloride adducts, magnesium dialkoxides or aryloxides, or carboxylated magnesium dialkoxides or aryloxides. Preferred compounds are magnesium di($C_{1-4}$)alkoxides, especially diethoxymagnesium. Additionally the procatalysts desirably comprise titanium moieties. Suitable sources of titanium moieties include titanium alkoxides, titanium aryloxides, and/or titanium halides. Preferred compounds used to prepare the procatalysts comprise one or more magnesium-di($C_{1-4}$)

alkoxides, magnesium dihalides, magnesium alkoxyhalides, or mixtures thereof and one or more titanium tetra($C_{1-4}$) alkoxides, titanium tetrahalides, titanium($C_{1-4}$)alkoxyhalides, or mixtures thereof.

Various methods of making precursor compounds used to prepare the present procatalysts are known in the art. These methods are described in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In a preferred method, the preparation involves chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Examples of suitable clipping agents include trialkyl borates, especially triethyl borate, phenolic compounds, especially cresol, and silanes.

A preferred precursor for use herein is a mixed magnesium/titanium compound of the formula $Mg_d Ti(OR^e)_e X_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 5, preferably 24, most preferably 3; e is 2-12, preferably 6-10, most preferably 8; and f is 1-10, preferably 1-3, most preferably 2. The precursors are ideally prepared by controlled precipitation through removal of an alcohol from the reaction mixture used in their preparation. An especially desirable reaction medium comprises a mixture of an aromatic liquid, especially a chlorinated aromatic compound, most especially chlorobenzene, with an alkanol, especially ethanol, and an inorganic chlorinating agent. Suitable inorganic chlorinating agents include chlorine derivatives of silicon, aluminum and titanium, especially titanium tetrachloride or titanium trichloride, most especially titanium tetrachloride. Removal of the alkanol from the solution used in the chlorination, results in precipitation of the solid precursor, having especially desirable morphology and surface area. Moreover, the resulting precursors are particularly uniform particle sized and resistant to particle crumbling as well as degradation of the resulting procatalyst.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present invention.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene and o-chlorotoluene are particularly preferred.

Suitable Ziegler-Natta procatalysts that may be used in the present invention may be prepared substantially according to the teachings of U.S. Pat. No. 4,927,797; U.S. Pat. No. 4,816,433 and U.S. Pat. No. 4,839,321. Desirably, the procatalyst is obtained by (i) suspending a dialkoxy magnesium optionally mixed with a titanium tetraalkoxide in an aromatic hydrocarbon or halohydrocarbon that is liquid at normal temperatures, (ii) contacting the suspension with a titanium halide and further (iii) contacting the resulting composition a second time with the titanium halide, and contacting the mixture with an internal electron donor sometime during the treatment with the titanium halide in (ii). Internal electron donors for use in the present catalyst composition to provide tacticity control and catalyst crystallite sizing are aromatic monocarboxylic acid esters or (poly)alkyl ether derivatives thereof, especially $C_{1-4}$ alkyl esters of benzoic acid, especially ethyl benzoate. The Ziegler-Natta, transition metal catalyst may also include an inert support material, if desired. The support should be an inert solid which does not adversely alter the catalytic performance of the transition metal compound. Examples include metal oxides, such as alumina, and metalloid oxides, such as silica.

Ziegler-Natta procatalyst compositions for use herein preferably are in the form of porous particles or crystallites of a relatively uniform size and shape, thereby allowing close face-to-face contacting between particles resulting in a relatively high bulk density in both a static or dynamic (fluidized) state. Although porous, the particles desirably have a gross morphology substantially in the shape of spheres, spheriodoblates, grains, or polyhedrons, preferably polyhedrons having 10 or more sides. Desirably the ratio of longest axis to shortest axis of the particles is less than 1.2. The particles generally lack surface protrusions. Desirably, 90 percent of the particles are circumscribable by a sphere having a diameter equal in length to the major axis thereof. Such procatalyst particles are referred to as "morphology controlled" procatalysts. Because morphology controlled catalyst compositions produce polymer with high bulk density (suitably greater than or equal to 0.35 g/cm$^3$) and are capable of generating large quantities of heat per unit volume, they are conceptually prone to forming polymer particle agglomerates. The present invention desirably imparts self-extinguishing properties to the catalyst composition, and accordingly is especially well suited for use with morphology controlled catalyst compositions.

Cocatalysts for use with the foregoing Ziegler-Natta catalysts according to the invention include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, preferably 1-6 carbon atoms in each alkyl- or alkoxide-group. Preferred cocatalytsts are $C_{1-4}$ trialkylaluminum compounds, especially triethylaluminum (TEA). The quantity of cocatalyst employed may vary within wide limits but generally is employed in an amount from 1 to 100 moles per mole of transition metal compound in the procatalyst.

One suitable method of practicing a polymerization process according to the present invention comprises performing the following steps in any order or in any combination, or subcombination of individual steps:

a) providing a Ziegler-Natta catalyst composition to a polymerization reactor;
b) providing an organoaluminum cocatalyst compound to the polymerization reactor;
c) providing a mixture of SCA's meeting the foregoing requirements to the polymerization reactor;
d) providing one or more polymerizable monomers including propylene to the reactor; and
e) extracting polymer product from the reactor.

In another suitable method of operation, the one or more esters of one or more aromatic monocarboxylic acids or substituted derivatives thereof may be added to the reactor intermittently as a means of controlling the polymerization activity in the reactor. In this method of operation, the reactor may be operated normally using only an alkoxysilane SCA and when conditions conducive to the formation of polymer agglomerates or a run away reaction are encountered, especially when polymerization temperatures exceed 80° C., more especially 100° C., the mixed SCA of the present invention may be formed in situ, by addition of the one or more esters of one or more aromatic monocarboxylic acids or substituted derivative thereof to the reactor contents for a time sufficient to reduce polymer agglomeration, sheeting, or fouling or to otherwise stabilize the polymerization.

In another suitable method of operation, the procatalyst is treated with the one or more esters of one or more aromatic monocarboxylic acids or substituted derivatives thereof (first SCA component) in the presence of the aluminum compound cocatalyst. The resulting composition may be stored and shipped prior to use or used directly in a polymerization reaction according to the invention by combining the same with one or more alkoxysilanes (second SCA component), optionally in combination with additional quantities of one or more monocarboxylic acid ester(s). In this embodiment, trialkylaluminum compounds are preferred cocatalysts. When used, this results in the procatalyst additionally comprising one or more esters of one or more aromatic monocarboxylic acids or substituted derivatives thereof and an aluminum alkyl compound and the catalyst composition is prepared by combining the same with one or more alkoxysilanes, optionally in combination with additional quantities of one or more monocarboxylic acid ester(s) and/or one or more cocatalysts.

In another suitable method of operation, the procatalyst may be treated with the alkoxysilane SCA component (second SCA component), optionally in the presence of an aluminum cocatalyst compound. The resulting composition may also be stored and shipped prior to use or used directly in a polymerization reaction according to the invention wherein only the alkyl ester SCA component (first SCA component) is separately added, or optionally in combination with additional quantities of one or more alkoxysilane(s). In this embodiment as well, trialkylaluminum compounds are preferred cocatalysts.

The catalyst composition of the invention may be used in most all commercially known polymerization processes, including those incorporating a pre-polymerization step, whereby a small amount of monomer is contacted with the catalyst after the catalyst has been contacted with the cocatalyst and the selectivity control agent mixture or individual components thereof. Then, the resulting preactivated catalyst stream is introduced into the polymerization reaction zone and contacted with the remainder of the monomer to be polymerized, and optionally one or more of the SCA components.

When used, this results in the procatalyst additionally comprising one or more alkoxysilane compounds and an aluminum alkyl compound and the catalyst composition is prepared by combining the same with one or more esters of one or more aromatic monocarboxylic acids or substituted derivatives thereof, optionally in combination with additional quantities of one or more alkoxysilane compounds and/or one or more cocatalysts.

Suitably, the polymerization is conducted at temperatures from 45 to 100° C., more preferably from 60 to 85° C. The foregoing temperatures are average temperatures of the reaction mixture measured at the reactor walls. Isolated regions of the reactor may experience localized temperatures that exceed the foregoing limits.

Preferred polymerization processes in which the present invention is particularly suited include gas phase, slurry, solution and bulk polymerization processes, operating in one or more than one reactor. Suitable gas phase polymerization processes include the use of condensing mode as well as super condensing mode wherein gaseous components including added inert low boiling compounds are injected into the reactor in liquid form for purposes of heat removal. When multiple reactors are employed it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA mixture, another SCA mixture, or individual SCA's comprising the present SCA mixture. Highly desirably, the mixture of SCA's is added to only the first reactor of the series. In another preferred embodiment, the polymerization process, or at least one step thereof, is a solution or slurry polymerization.

More preferably, the process of the invention is conducted in two reactors in which two olefins, most preferably, propylene and ethylene, are contacted to prepare a copolymer. In one such process, polypropylene is prepared in the first reactor and a copolymer of ethylene and propylene is prepared in the second reactor in the presence of the polypropylene prepared in the first reactor. Regardless of the polymerization technique employed, it is understood that the mixture of SCA's and the catalyst composition to be employed, or at least the procatalyst component thereof may be contacted in the absence of other polymerization components, especially monomer, prior to addition to the reactor.

The following embodiments are provided as specific enablement for the appended claims.

1. A catalyst composition for the polymerization of propylene or mixtures of propylene and one or more copolymerizable comonomers, said catalyst composition comprising one or more Ziegler-Natta procatalyst compositions comprising one or more transition metal compounds and one or more monoesters of aromatic carboxylic acid internal electron donors; one or more aluminum containing cocatalysts; and a mixture of two or more different selectivity control agents, said SCA mixture comprising from 98.0 to 99.9 mol percent of one or more esters of one or more aromatic monocarboxylic acids or substituted derivatives thereof, and from 2.0 to 0.1 mol percent of one or more alkoxysilane compounds.

2. The catalyst composition of embodiment 1 wherein the internal electron donor is ethyl benzoate.

3. The catalyst composition of embodiment 1 wherein the SCA mixture comprises ethyl p-ethoxybenzoate and an alkoxysilane containing two or three methoxy groups.

4. The catalyst composition of embodiment 3 wherein the alkoxysilane is dicyclopentyldimethoxysilane or methylcyclohexyldimethoxysilane.

5. A catalyst composition according to embodiment 1 wherein the total quantity of selectivity control agent employed is limited to provide a molar ratio, based on transition metal, from 1 to 100.

6. A catalyst composition according to any one of embodiments 1-5 wherein the SCA mixture comprises from 98.5 to 99.5 mol percent of one or more alkyl esters of one or more aromatic monocarboxylic acids or substituted derivatives thereof, and from 1.5 to 0.5 mol percent of one or more alkoxysilane compounds 7. A polymerization process comprising contacting propylene or a mixture of propylene and one or more copolymerizable comonomers under polymerization conditions at a temperature from 45 to 100° C. with a catalyst composition comprising one or more Ziegler-Natta procatalyst compositions comprising one or more transition metal compounds and one or more internal electron donors selected from the group consisting of esters of aromatic monocarboxylic acids; one or more aluminum containing cocatalysts; and a mixture of two or more different selectivity control agents, said SCA mixture comprising from 98.0 to 99.9 mol percent of one or more esters of one or more aromatic monocarboxylic acids or substituted derivatives thereof, and from 2.0 to 0.1 mol percent of one or more alkoxysilane compounds.

8. The method of embodiment 7 conducted at a temperature from 60 to 85° C.

9. The method of embodiment 7 wherein the internal electron donor is ethyl benzoate.

10. The method of embodiment 7 wherein the SCA mixture comprises ethyl p-ethoxybenzoate and a dimethoxysilane.

11. The method of embodiment 7 wherein the alkoxysilane is dicyclopentyldimethoxysilane or methylcyclohexyldimethoxysilane.

12. The method according to any one of embodiments 7-11 conducted under gas phase polymerization conditions.

13. The method according to any one of embodiments 7-11 which is conducted in more than one reactor operating in series.

The invention is further illustrated by the following examples that should not be regarded as limiting of the present invention. Unless stated to the contrary or conventional in the art, all parts and percents are based on weight.

EXAMPLE 1

A titanium containing Ziegler-Natta catalyst composition is employed to produce polypropylene homopolymers. The catalyst composition includes a procatalyst compound prepared by slurrying a mixture of a magnesium diethoxide and titanium ethoxide/chloride containing precursor corresponding to the formula $Mg_3Ti(OC_2H_5)_8Cl_2$ (made substantially according to U.S. Pat. No. 5,077,357) with ethyl benzoate (0.10 ml/gram precursor) in a 50/50 (vol/vol) mixture of $TiCl_4$/monochlorobenzene (MCB, 15.9 ml/gram precursor). After the mixture is heated at 70° C. for 30 minutes, it is filtered. The resulting moist mass is slurried in a 50/50 $TiCl_4$/MCB mixture (15.9 ml/gram precursor) and benzoyl chloride (0.056 ml/gram precursor) at 99° C. for 10 minutes and filtered. The last process is repeated once with 0.10 ml/gram precursor at 95° C. for 10 minutes. The resulting solid is rinsed with isopentane and then dried with flowing warm nitrogen.

Propylene polymerizations are carried out in a 3.6 L, jacketed, stirred stainless steel reactor. All solvents and the reactor interior are dried prior to use. The reactor conditions employed are: an initial charge of 3.0 standard liters $H_2$, 2.7 liters propylene, 2.5 ml of a 5 percent solution of triethylaluminum (TEA) in heptane, measured quantities of SCAs for a total amount of 0.35 mmol (calculated to give a SCA/Ti ratio of 70/1 and a Al/SCA molar ratio of 2.0), and 16.43 mg of the procatalyst as a 5.0 percent mineral oil slurry. Catalyst components are injected into reactor at 60° C. Polymerization is conducted at 67° C. for one hour. Upon completion of polymerization, the reactor is vented to ambient pressure and opened to the atmosphere.

The SCA mixtures tested include: dicyclopentyldimethoxysilane (DCPDMS)/PEEB, methylcyclohexyldimethoxysilane (MChDMS)/PEEB, diisobutyldimethoxysilane (DiBDMS)/PEEB, and n-propyltrimethoxysilane (NPTMS)/PEEB. Normalized activity ($Y_4$) for the various SCA combinations, amounts and temperatures are provided in Table 1.

TABLE 1

Polymerization Results

| Run | SCA mixture | Silane/Ester (mol percent) | Activity, $Y_4$ (kg/g procat.) | $Y_4$ increase (percent) |
|---|---|---|---|---|
| 1* | DCPDMS/PEEB | 0/100 | 22.0 | |
| 2 | " | 0.5/99.5 | 28.6 | 30 |
| 3 | " | 1.0/99.0 | 23.7 | 8 |
| 4 | " | 2.0/98.0 | 26.9 | 20 |
| 5* | MChDMS/PEEB | 0/100 | 23.7 | |
| 6 | " | 0.5/99.5 | 28.6 | 21 |
| 7 | " | 1.0/99.0 | 29.4 | 24 |
| 8 | " | 2.0/98.0 | 29.3 | 24 |
| 9* | DiBDMS/PEEB | 0/100 | 25.8 | |
| 10 | " | 0.5/99.5 | 28.7 | 11 |
| 11 | " | 1.0/99.0 | 27.9 | 8 |
| 12 | " | 2.0/98.0 | 26.7 | 4 |
| 13* | NPTMS/PEEB | 0/100 | 23.7 | |
| 14 | " | 0.5/99.5 | 21.8 | decrease |
| 15 | " | 1.0/99.0 | 25.6 | 8 |
| 16 | " | 2.0/98.0 | 26.6 | 12 |

*comparative, not an example of the invention

As may be seen by reference to the results of Table 1, by using certain mixtures of SCA's according to the invention, improved polymerization activity (normalized to standard XS content) may be obtained compared to use of the carboxylic acid ester compound alone. The best results are obtained by the use of an SCA mixture containing a silane containing a $C_{5-6}$ cyclic group.

Moreover, by using certain mixtures of SCA's according to the invention, reduced polymerization activity may be obtained at elevated polymerization temperatures, compared to use of the silane SCA compound alone or compared to the use of the same SCA mixture at a lower polymerization temperature. The reduction may be controlled by adjusting the quantities of silane and secondary SCA employed, so that activity levels substantially less than those obtainable by use of the silane SCA alone or less than the activity with the same SCA mixture at 67° C. are obtainable. Those illustrated compositions possess self-extinguishing polymerization properties. Although using larger amount of alkoxysilane may lead to higher catalyst activity, the self-extinguishing property of the catalyst system diminishes with increasing amount of alkoxysilane. For a process that requires high degree of self-extinguishing property, a mixture containing small amount of alkoxysilane is beneficial. Accordingly, use of such SCA mixtures can reduce or avoid an uncontrolled acceleration of the reaction, as well as softening or melting of polymer particles that leads to agglomerate formation and sheeting or fouling of the reactor.

The invention claimed is:

1. A catalyst composition for the polymerization of propylene or mixtures of propylene and one or more copolymerizable comonomers, said catalyst composition comprising one or more Ziegler-Natta procatalyst compositions comprising:
   one or more transition metal compounds and one or more monoesters of aromatic carboxylic acid internal electron donors;
   one or more aluminum containing cocatalyst; and
   a mixture of two or more different selectivity control agents (SCA), said SCA mixture comprising from 98.5 to 99.9 mol percent of one or more esters of one or more aromatic monocarboxylic acids or substituted derivatives thereof, and from 1.5 to 0.1 mol percent of one or more alkoxysilane compounds.

2. The catalyst composition of claim 1 wherein the internal electron donor is ethyl benzoate.

3. The catalyst composition of claim 1 wherein the SCA mixture comprises ethyl p-ethoxybenzoate and an alkoxysilane containing two or three methoxy groups.

4. The catalyst composition of claim 1 wherein the alkoxysilane is dicyclopentyldimethoxysilane or methylcyclohexyldimethoxysilane.

5. A catalyst composition according to claim 1 wherein the total quantity of selectivity control agent employed provides a molar ratio, based on transition metal, from 1 to 100.

6. The catalyst composition according to claim 1 wherein the SCA mixture comprises from 98.5 to 99.5 mol percent of one or more alkyl esters of one or more aromatic monocarboxylic acids or substituted derivatives thereof, and from 1.5 to 0.5 mol percent of one or more alkoxysilane compounds.

7. The catalyst composition of claim 1 wherein the SCA mixture comprises from 98.6 to 99.0 mol percent of one or more alkyl esters of one or more aromatic monocarboxylic acids or substituted derivatives thereof, and from 1.4 to 1.0 mol percent of one or more alkoxysilane compounds.

8. The catalyst composition of claim 1 wherein the alkoxysilane is selected from the group consisting of diisopropyldimethoxysilane, diisobutyldimethoxysilane, and isobutylisopropyldimethoxysilane.

9. The catalyst composition of claim 1 wherein the SCA mixture comprises ethyl p-ethoxybenzoate and an alkoxysilane selected from the group consisting of dicyclopentyldimethoxysilane, methylcyclohexyldimethoxysilane, and n-propyltrimethoxysilane.

10. The catalyst composition of claim 1 wherein the Ziegler-Natta procatalyst composition is a morphology controlled procatalyst.

11. A polymerization method comprising:
    contacting propylene or a mixture of propylene and one or more copolymerizable comonomers under polymerization conditions at a temperature from 45 to 100° C. with a catalyst composition comprising one or more Ziegler-Natta procatalyst compositions comprising one or more transition metal compounds and one or more internal electron donors selected from the group consisting of esters of aromatic monocarboxylic acids, one or more aluminum containing cocatalysts; and a mixture of two or more different selectivity control agents, said SCA mixture comprising from 98.5 to 99.9 mol percent of one or more esters of one or more aromatic monocarboxylic acids or substituted derivatives thereof, and from 1.5 to 0.1 mol percent of one or more alkoxysilane compounds.

12. The method of claim 11 conducted at a temperature from 60 to 85° C.

13. The method of claim 11 wherein the internal electron donor is ethyl benzoate.

14. The method of claim 11 wherein the SCA mixture comprises ethyl p-ethoxybenzoate and a dimethoxysilane.

15. The method of claim 11 wherein the alkoxysilane is dicyclopentyldimethoxysilane or methylcyclohexyldimethoxysilane.

16. The method according to claim 11 conducted under gas phase polymerization conditions.

17. The method according to claim 11 conducted in more than one reactor operating in series.

* * * * *